United States Patent
Logan

[15] 3,683,842
[45] Aug. 15, 1972

[54] LIGHT BRACKET FOR FARM VEHICLES

[72] Inventor: Kenneth G. Logan, Des Moines, Iowa

[73] Assignee: Sablite Corp., Des Moines, Iowa

[22] Filed: May 22, 1970

[21] Appl. No.: 39,655

[52] U.S. Cl. .................... 116/28, 248/43, 340/87
[51] Int. Cl. ............................................... B60q
[58] Field of Search ........ 116/28, 114, 173, 174, 175, 116/132; 240/8.1, 8.18, 8.3; 280/150; 340/81, 87, 93, 100, 115, 119; 248/38, 40, 43, 41, 300, 265, 295, 161; 211/182

[56] References Cited

UNITED STATES PATENTS

| | | | |
|---|---|---|---|
| 339,976 | 4/1886 | Deitz | 248/43 X |
| 2,295,676 | 9/1942 | Meyer | 248/40 |
| 1,198,840 | 9/1916 | Hanck et al. | 248/300 X |
| 1,296,866 | 3/1919 | Skretting | 248/300 X |
| 1,310,234 | 7/1919 | Denning | 40/39 X |
| 2,241,082 | 5/1941 | Dabelstein | 248/265 |
| 2,292,523 | 8/1942 | Hynek | 248/41 |
| 2,324,614 | 7/1943 | Dalton | 116/28 |
| 2,748,745 | 6/1956 | Pobanz et al. | 116/173 |
| 2,937,362 | 5/1960 | Hartnett | 340/87 |
| 3,166,199 | 1/1965 | Hawkins et al. | 211/182 |
| 3,473,148 | 10/1969 | Koenig | 340/87 |
| 3,487,360 | 12/1969 | Thompson | 340/87 |

*Primary Examiner*—Louis J. Capozi
*Attorney*—Zarley, McKee & Thomte

[57] ABSTRACT

A light bracket for farm vehicles comprising a vertically disposed first bracket member having second and third bracket members extending horizontally from the upper and lower ends thereof respectively. The second and third bracket members each have an opening formed therein which receive a warning light supporting stem therein. A thumbscrew means threadably extends through the first bracket member and is adapted to engage the stem to maintain the stem in selected positions of its vertical movement so that the warning light can be raised when the vehicle is being used on the highway and so that the warning light can be lowered when the vehicle is not being used on the highway. A fourth bracket member extends from the third bracket member and is secured to the vehicle.

1 Claim, 4 Drawing Figures

PATENTED AUG 15 1972 3,683,842

INVENTOR
KENNETH G. LOGAN
BY
Zarley, McKee & Thomte
ATTORNEYS

LIGHT BRACKET FOR FARM VEHICLES

The operation of vehicles such as farm tractors and trailers on the roads and highways creates a distinct hazard due to the inadequate warning lights thereon. Some attempts have been made to mount warning lights on these vehicles but the lights are not sufficiently visible on the highway or are located in a position that subjects them to damage when the vehicle is being operated on the farm.

Therefore, it is a principle object of this invention to provide a light bracket for farm vehicles.

A further object of this invention is to provide a light bracket for farm vehicles adapted to selectively vertically support a warning light supporting stem.

A further object of this invention is to provide a warning light bracket which permits the warning light to be raised when the vehicle is being operated on the highway and which permits the warning light to be lowered when the vehicle is being operated on the farm.

A further object of this invention is to provide a warning light bracket which is easily attached to the vehicle.

A further object of this invention is to provide a light bracket for farm vehicles which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
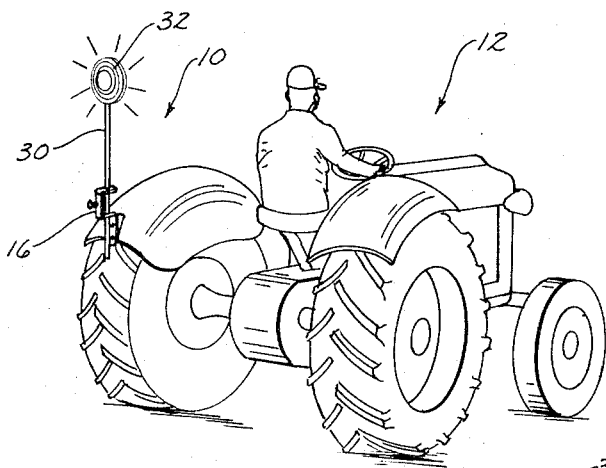
FIG. 1 is a rear perspective view of a farm tractor having the light bracket of this invention mounted thereon.
Figure 2:
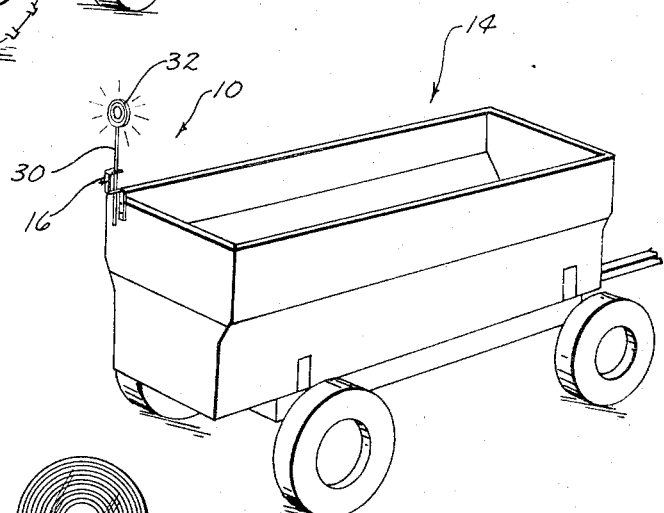
FIG. 2 is a rear perspective view of the light bracket of this invention mounted on a trailer.

The light bracket of this invention is designated by the reference numeral 10 and may be mounted on a farm tractor 12 such as seen in FIG. 1 or may be mounted on a trailer 14 such as illustrated in FIG. 2. Bracket 10 comprises a vertically disposed bracket member 16 having bracket members 18 and 20 extending horizontally from the upper and lower ends thereof respectively. Bracket member 22 extends from bracket member 20 and has a plurality of openings 24 formed therein for facilitating the attachment of the bracket to the vehicle. The precise angular relationship of bracket member 22 with respect to bracket member 20 will depend upon the location of the bracket on the vehicle. The bracket member 22 may be bent with respect to bracket 20 to correspond to the configuration of the vehicle. Screws, bolts, or the like would be extended through the openings 24 to provide a rigid attachment of the bracket to the vehicle.

Figures 3, 4:
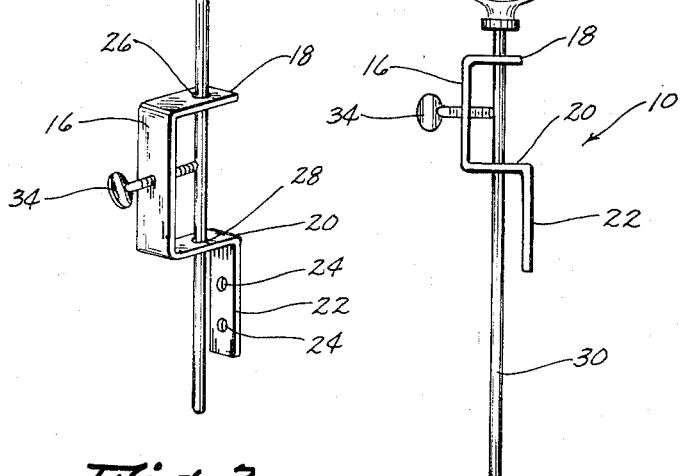
FIG. 3 is a perspective view of the light bracket of this invention.
FIG. 4 is a side view of the light bracket.

Bracket members 18 and 20 are provided with openings 26 and 28 respectively formed therein which have a round configuration. The numeral 30 refers to a warning light supporting stem which is received by the openings 26 and 28 in the manner illustrated in FIGS. 3 and 4. Preferably, the openings 26 and 28 are round with the configuration of stem 30 also being round to permit the stem 30 to be selectively rotated with respect to the bracket so that the warning light 32 may be properly oriented. A thumbscrew means 34 threadably extends through bracket member 16 and is adapted to engage the stem 30 between bracket members 18 and 20 to maintain the stem 30 in position with respect to the bracket. The thumbscrew means 34 causes the stem 30 to move into engagement with the bracket members 18 and 20 adjacent to openings 26 and 28 and the frictional engagement therebetween yieldably prevents the stem from vertically moving or rotating.

Preferably, the warning light 32 is of the flashing type and would be connected to the vehicle electrical system. However, warning light 32 is conventional in construction and may be of any type conventionally known in the art. Preferably, the bracket 10 is mounted on the rearward end of the vehicle at the left side thereof. When the vehicle is being used on the highway, thumbscrew means 34 is loosened to permit the stem 30 to be vertically raised to its uppermost position with respect to the bracket 10 so that the warning light 32 will be visible in all directions by approaching traffic. The thumbscrew means 34 is then tightened to maintain the stem 30 in its desired position. When the vehicle is not being operated on the farm, it is advantageous to lower the warning light 32 so that is will not become inadvertently damaged. In other words, the warning light 32 may be moved to a lower or inoperative position. Thus, it can be seen that the unique light mounting bracket has been provided which not only permits the bracket to be easily attached to the vehicle but also permits the warning light to be easily raised or lowered as desired. Thus it can be seen that the invention accomplishes at least all of its stated objectives.

I claim:

1. In combination, a bracket means having first, second, third, and fourth bracket members, said first bracket member being vertically disposed and having upper and lower ends, said second and third bracket members being horizontally disposed and extending from said upper and lower ends respectively of said first bracket member and extending therefrom in the same direction, said fourth bracket member extending downwardly from said third bracket so as to impart a question-mark shape to said bracket means, said fourth bracket member being made of a material which can be easily bent to conform to the configuration of a vehicle;

said second and third bracket members each having an opening therein, said openings being in vertical registered alignment;

an elongated supporting stem, having upper and lower ends, vertically slidably mounted within said openings in said second and third bracket members, a warning element on the upper end of said supporting stem, said supporting stem being movable from a first position wherein said lower end of said supporting stem is positioned closely below said third bracket member to a second position wherein the warning element is positioned closely above said second bracket member, and a thumbscrew means horizontally threadably extending through said first bracket member and having an inner end adapted to frictionally engage said supporting stem at a point between said second and third bracket members for selectively maintaining said supporting stem in said first and second positions and intermediate positions therebetween, said openings in said second and third bracket members having a configuration complementary to said stem, said bolt means causing said stem to engage said second and third bracket members adjacent said openings, said fourth bracket member having openings formed therein to facilitate its attachment to the vehicle, said first, second, third and fourth bracket members being integrally formed, each of said bracket members having a flat, rectangular shape.

* * * * *